S. G. HUDSON.
FARM GATE.
APPLICATION FILED APR. 9, 1908.
905,430.
Patented Dec. 1, 1908.
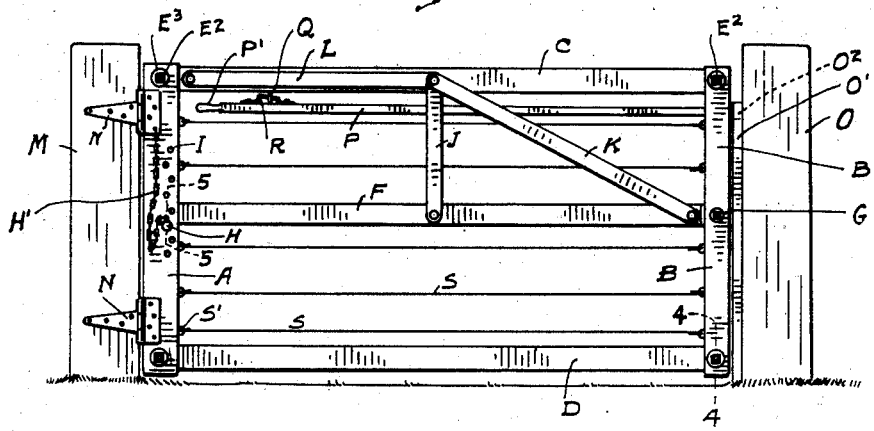
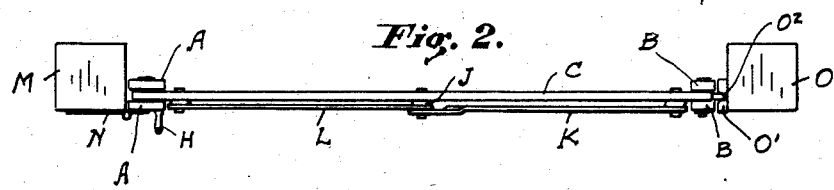
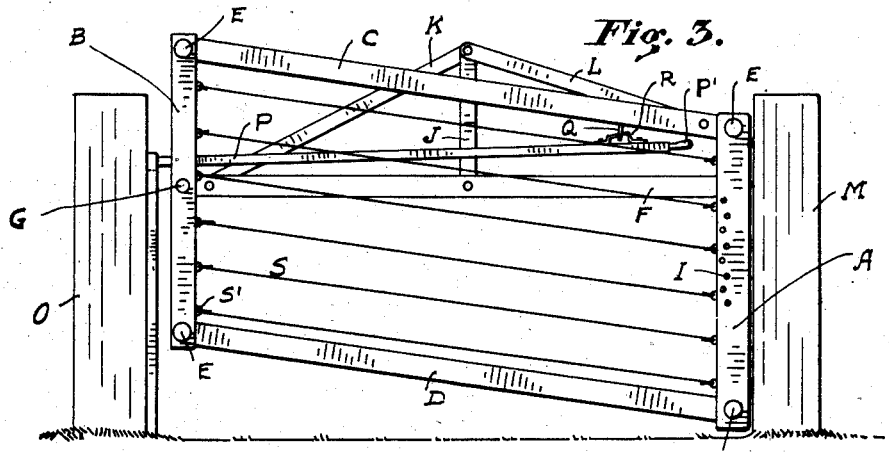
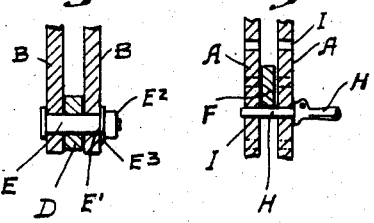
WITNESSES:
Clinton D. Murray
Ethel L. Lister.
INVENTOR
SAMUEL G. HUDSON,
BY
Thomas L. Ryan
ATTORNEY

UNITED STATES PATENT OFFICE.

SAMUEL G. HUDSON, OF MUNCIE, INDIANA, ASSIGNOR OF ONE-HALF TO EDWARD F. BENDER, OF MUNCIE, INDIANA.

FARM-GATE.

No. 905,430.     Specification of Letters Patent.     Patented Dec. 1, 1908.

Application filed April 9, 1908. Serial No. 426,013.

*To all whom it may concern:*

Be it known that I, SAMUEL G. HUDSON, a citizen of the United States, and a resident of the city of Muncie, in the county of Delaware and State of Indiana, have invented a new and useful Farm-Gate, of which the following is a specification.

This invention relates to improvements in swinging gates and has for its objects to provide a gate which will be simple in construction, comparatively light in weight, and to provide means whereby sagging will be prevented and whereby the free end of the gate may be easily raised or lowered and may be maintained at different heights.

The objects of my invention are accomplished in the new construction combination and arrangement of parts described in this specification, illustrated in the accompanying drawings and pointed out in the appended claims.

In the drawings Figure 1 is a side view and Fig. 2 is a top-plan view if my improved gate. Fig. 3 is a reverse side view of said gate in raised open position. Fig. 4 is a detached enlarged transverse sectional view taken on the line 4—4 Fig. 1; and Fig. 5 is a similar view taken on the line 5—5 Fig. 1. Fig. 6 is an enlarged view of the pin E removed.

Similar characters of reference refer to like parts throughout the several views.

The main-upright A and the end-upright B are each composed of a pair of members of suitable area in cross-section, oppositely disposed to each other and between said members the ends of the upper-rail C and the lower-rail D are disposed. The ends of this upper-rail C and of the lower-rail D are pivotally secured to the main-upright A and the end-upright B, by the shouldered pins E shown in detail in Fig. 4. These pins E pass through suitable perforations therefor in the upper and lower-rails and the length of each of the pins to the shoulder $E^1$ is such that when the nut $E^2$ is screwed down against the washer $E^3$ there will be a slight clearance between the said rails and the members composing the main-upright and the end-upright.

The lift-bar F is disposed on a line parallel to that of the rails and its forward end is pivotally secured to the end-upright by a suitable pin G. The rear end of the lift-bar F is disposed between the members composing the main-upright and is free to be moved upwardly or downwardly, and is supported in the desired raised and lowered positions on the hand-pin H which may be easily inserted into any of the several transverse perforations I provided in the main-upright. This hand-pin H may be attached to the gate by a suitable light chain H'.

J designates a vertical-bar having its lower end pivotally connected to the lift-bar near its central portion. Pivotally connected to the forward end of the lift-bar F is the diagonal-bar K which has its other end pivotally connected to the vertical-bar J. The similar diagonal-bar L which is pivotally connected to the rear end of the upper-rail C near the main-upright A has its other end pivotally connected to the top of the vertical-bar J and to the diagonal-bar K. These said pivotal connections each are composed of an ordinary bolt and washer.

The most essential features of my invention are included in the construction combination and arrangement of the parts thus far described.

The gate is supported on the hinge-post M by suitable hinge devices connected to the main-upright, I have found the well known hinge N to be a practical hinge-connection.

My improved gate when in closed position appears as shown in Fig. 1, the face of the end-upright being in the usual free engagement with the fence-post O. This fence-post O may be provided with a facial vertical recess therein to receive the latch-bar of the gate, or may be provided with the latch-bar strip $O^1$ having the recess $O^2$ therein as shown in Fig. 1 and Fig. 2.

Disposed beneath the upper-rail C is the latch-bar P having its forward end disposed between the sides of the end-upright B and adapted to move freely between them and to have its end, when projected, rest in the recess $O^2$ of the latch-bar strip $O^1$. This latch-bar is of such length that the handle $P^1$ provided at the rear end thereof will be near the main-upright A. A loose connection of the latch-bar P to the underside of the upper-rail C is so provided and arranged that when the gate is in closed position as shown in Fig. 1 the forward-end of the latch-bar will be lower than the other end, and the forward end thereof will retain its engagement with the recess O² when the forward end of the gate is raised, as will be presently referred to. A desirable loose connection for this latch-bar is shown in the drawings and consists of a staple Q that is rigidly secured to the underside of the upper-rail C and is loosely engaged by the bent bar R that is secured by screws or bolts to the upper edge of the latch-bar. The rear portion of this bent-bar R is of such height greater than the height of the front portion that the latch-bar will at all times have a tendency to force itself forwardly thereby retaining its forward end in engagement with the recess O² whether the free end of the gate may be in either the raised or lowered position.

My improved gate may be provided with intermediate rails of suitable material having connections on the exterior faces or the transverse edges of the main-upright and end-upright. Where it is desired that wire should be used for this purpose, the lines of wire S may be secured by staples S¹ of suitable size, as plainly shown in Fig. 3.

The general structure and arrangement which is shown and described herein I have contemplated as the best for carrying my invention into effect. It is intended that my improved gate may be made of wood or of metal, and it is understood that minor changes may be made in the construction and details and arrangement of parts, without affecting the spirit or principle of my invention.

From the foregoing description and by reference to the drawings, the mode of operation and use of my invention will be apparent. My improved gate when in the normal closed position appears as shown in Fig. 1 the hand-pin H occupying such one of the perforations I that the gate is sustained in the correct position and alinement as shown. The entire manipulation of the gate is accomplished from a position immediately adjacent the hinge-post M. When the gate is to be swung open the handle of the latch-bar is depressed thereby raising the forward end thereof free from the slot O². In the movement of the gate thus swung if the forward end should impinge against a raised portion of ground or a ridge of snow, the lift-bar F is raised sufficiently so that the obstacle may be passed, and the lift-bar returned to its normal position. Should it be desired that the gate is to remain open the forward-end is "let-down" to rest on the ground and thus the main-post and hinge connections are relieved entirely of the weight of the gate, and the gate is prevented from swinging.

When it is desired to open the gate for the passing of the smaller stock only, such as hogs or sheep, the lift-bar F is simply raised and the hand-pin H is re-inserted in the proper one of the upper perforations I and the forward end of the gate is sustained in the elevated position as shown in Fig. 3, the latch-bar retaining its engagement with the recess O² in the manner as hereinbefore described. Should this gate under stress of a long period of usage possibly become worn, or for any cause have a tendency to sag, such tendency may be at once arrested and the gate sustained in proper form, by raising the lift-bar F and adjustment of the hand-pin H.

What I claim as my invention and desire to secure by Letters Patent, is—

1. In a gate, the combination with the frame thereof having its members pivotally connected to each other, of a horizontal member having its one end pivotally connected to one of the upright-members, and its free end adapted to be sustained at different positions on the other upright member, a hinge-jointed member having its one end pivotally connected to said frame at the corner thereof above the free end of the said horizontal member, and its other end pivotally secured at the fixed end of said horizontal member, and a vertical member having its bottom end pivotally secured to said horizontal member and upper end pivotally secured at the joint of said hinge-jointed member, substantially as described.

2. In a gate, the combination with a frame proper the longitudinal members thereof being connected pivotally to the upright members, of means to raise and lower and to sustain in different raised and lowered positions the free end of said gate-frame, including a hinge-jointed bar that has one end pivotally secured to the upper portion of the fixed end of the frame, the other end being pivotally secured to the free end of the frame the joint of said hinge-jointed bar being substantially equidistant from the ends thereof, a longitudinally disposed lift-bar having one end pivotally secured to the free end of the frame the other end of said lift-bar being adapted to be sustained in adjustable engagement with the fixed upright of said frame, and an upwardly disposed member to pivotally connect the lift-bar to the hinge-jointed bar, substantially as described.

3. In a gate, the combination with a frame proper the longitudinal members thereof being connected pivotally to the upright members, of a hinge-jointed bar that has one end pivotally secured to the upper portion of the fixed end of the frame the other end of said hinge-jointed bar being pivotally secured to the free end of the frame the joint of said hinge-jointed bar being substantially equidistant from the ends thereof, devices having connections with said hinge-jointed bar and supported on the gate frame to raise and lower and to sustain in different raised and lowered position, said hinge-jointed bar, a latch-bar slidably connected to said gate frame and adapted to retain engagement with the fence-post, substantially as described.

4. The combination of a gate-frame composed of an upper and lower rail having their ends pivotally secured between the sides of a main upright A and an end-upright B, substantially as described, a longitudinally disposed lift-bar having one end pivotally secured between the sides of the end-upright and the other end adapted to move upwardly or downwardly between the sides of the main-upright and to be sustained at different heights on said main-upright, a hinge-jointed bar having the hinge substantially equidistant from its ends, one end of said hinge-jointed bar being pivotally connected to the upper rail near the main-upright, the other end being pivotally connected to the lift-bar near the end-upright, and an upwardly-disposed member to connect pivotally together the lift-bar and the hinge-jointed bar, a latch-bar disposed downwardly and having the free end thereof sustained normally between the sides of the end-upright, and its end near the main-upright being supported in slidable engagement with the upper rail, substantially as set forth and shown.

In testimony whereof I sign my name to this specification in the presence of two subscribing witnesses.

SAMUEL G. HUDSON.

Witnesses:
EDWARD F. BENDER,
THOMAS L. RYAN.